United States Patent [19]

Scott et al.

[11] Patent Number: 4,553,641
[45] Date of Patent: Nov. 19, 1985

[54] HAND-OPERATED BICYCLE BRAKE ASSEMBLY

[76] Inventors: Edward L. Scott, South Highway 75, Ketchum, Id. 83340; Walter D. Teague, Jr., 155 Tweed Blvd., Nyack, N.Y. 10960

[21] Appl. No.: 534,678
[22] Filed: Sep. 22, 1983
[51] Int. Cl.⁴ .......................... B62L 1/00; B62L 1/10
[52] U.S. Cl. ................... 188/24.22; 74/501 R; 188/2 D; 188/205 R; 188/250 G; 403/122
[58] Field of Search ............... 188/24.21, 24.11–24.22, 188/2 D, 250, 73.1, 205, 206, 25–27, 234; 74/501 R, 489; 403/90, 405–409, 121–131; 411/337

[56] References Cited

U.S. PATENT DOCUMENTS

| 4,051,924 | 10/1977 | Yoshigai | 188/24.12 |
| 4,290,507 | 9/1981 | Brown | 188/24.15 |
| 4,391,352 | 7/1983 | Brown | 188/24.12 |

*Primary Examiner*—Douglas C. Butler
*Attorney, Agent, or Firm*—Shoemaker and Mattare, Ltd.

[57] ABSTRACT

A hand-operated bicycle brake assembly includes a pair of complementary, similar, preferably identical, caliper arms having a pre-formed configuration, central supporting structure including a central aperture through the elongated caliper arm and a complementary central aperture through an offset planar portion extending from the central area of the arm, one end of the arm provided with a concave recess and threaded aperture for a locking bolt therein, a brake shoe, a support hub integral therewith and provided with spherical projections at each end for mating with a recess in the caliper arm and a bushing and secured to the caliper arm by a through bolt, the caliper arm being forked and provided with a cable clamp nut and bolt. The cable clamp nut and bolt is in two parts for engaging a cable as passed through a slot in the bolt. The brake assembly further comprises a support head having a mounting bolt for attachment thereof in adjustable fashion to a bicycle frame and a bearing support projection extending therefrom for supporting the complementary pair of caliper arms thereupon by central mounting apertures thereof. Low friction bearing washers and sleeve are provided with a locking bolt for retaining the caliper arms on the support projection and finishing the assembly.

22 Claims, 16 Drawing Figures

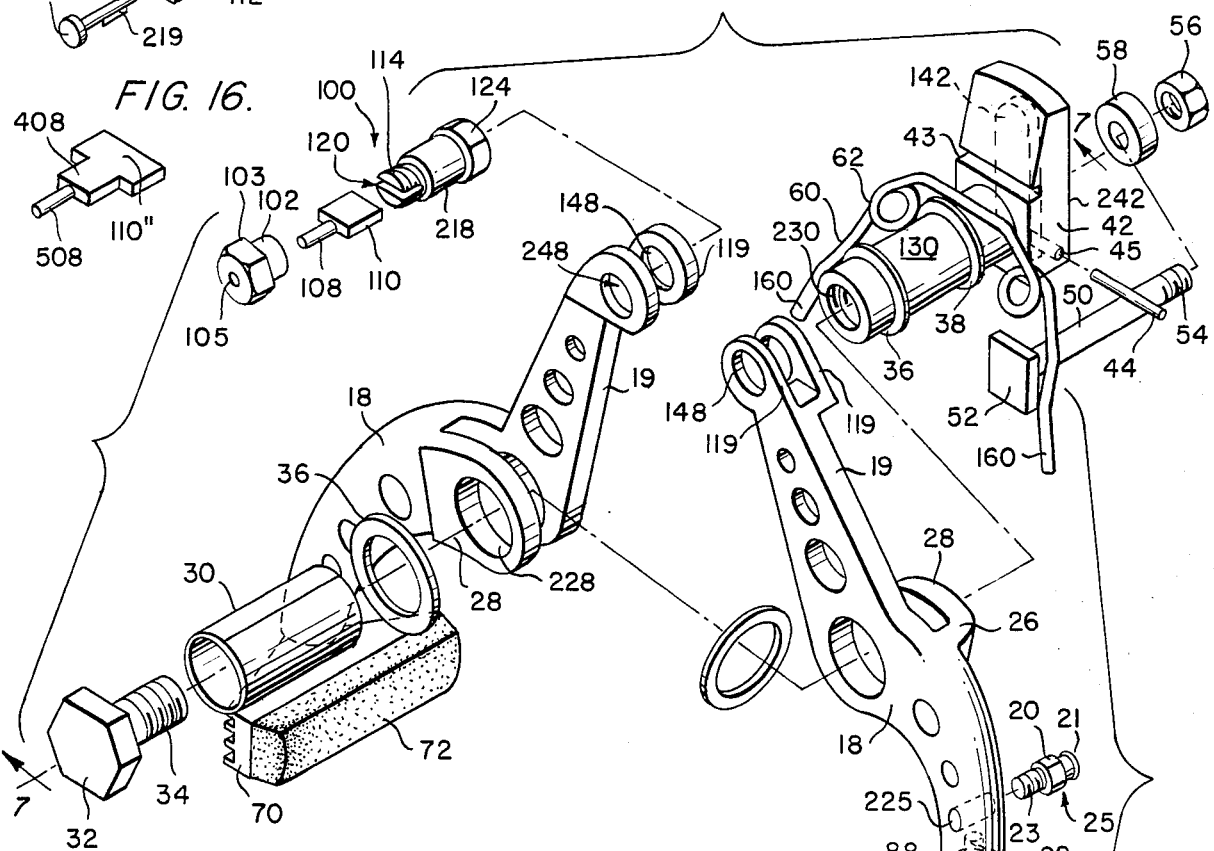

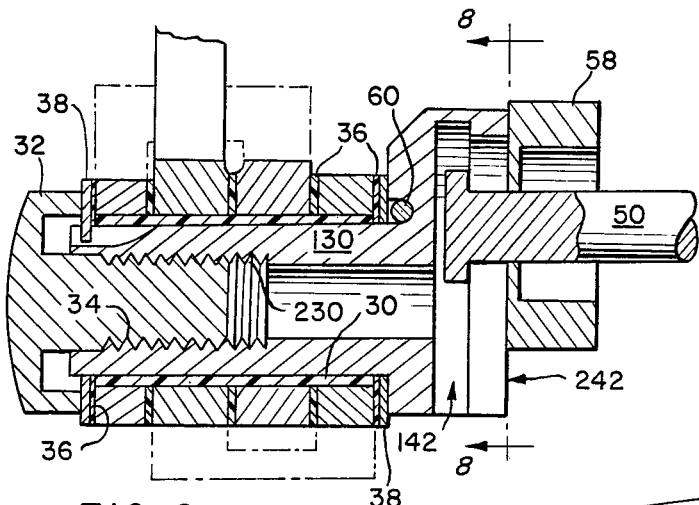
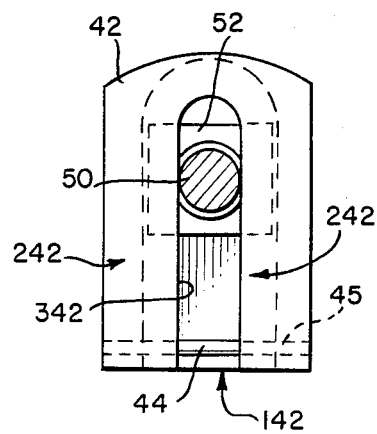
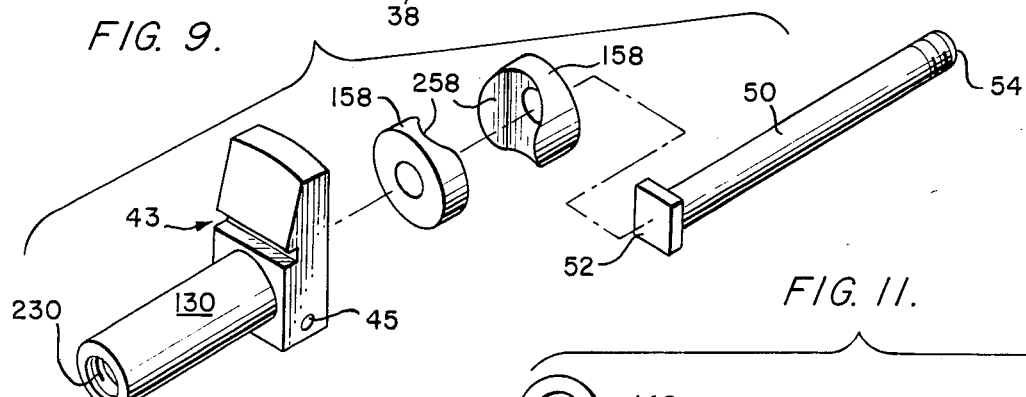
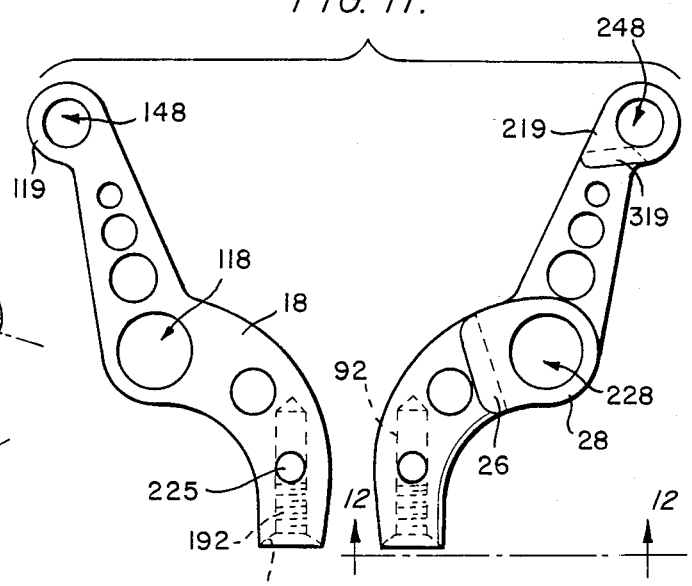
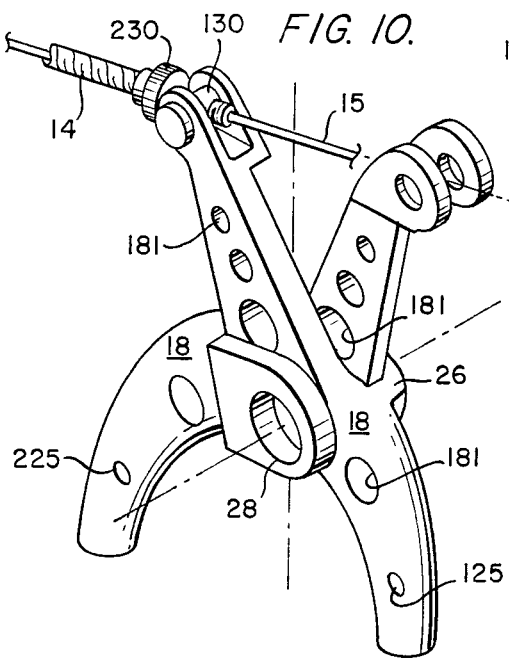
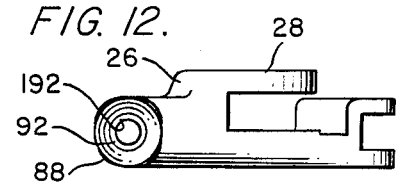

HAND-OPERATED BICYCLE BRAKE ASSEMBLY

BACKGROUND OF THE INVENTION

1. Field of the Invention

This invention relates generally to bicycle brakes and their construction, assembly and improved operating capabilities.

2. Description of the Prior Art

A common problem with bicycle brakes of conventional type is that the mounting bolt for caliper-type brakes, normally of approximately 6 mm diameter, flexes under the stress of braking. Under braking stress the front bolt flexes upwardly and the rear one downwardly. A larger, stiffer bolt generally is not used because at the front it would require a larger hole in the fork crown, one of the already most highly stressed parts of a bicycle, and thus weaken it even further, which is highly undesirable, and at the rear, a larger bolt would just about sever the skimpy brake bridge of the bicycle. Therefore, these generally 6 mm bolts are common in the present state of the art. Furthermore, these 6 mm bolts also serve as pivot bearings on side pull brakes, which is a fairly inadequate size. Several companies have used slightly larger bolts of $\frac{1}{4}''$ (0.014" larger) on a section outboard of the 6 mm part that actually goes through the bicycle frame, and another company uses 8 mm (0.315") on this enlarged portion. However, in both cases the bolt itself which passes through the frame is still 6 mm where it leaves the bicycle frame, and, of course, that is where it starts bending.

Another problem with known type brake assemblies is that the caliper arms of conventional side-pull type have a cross-section that is approximately a $\frac{1}{2}''$ half-round, such shape, of course, being very inefficient. When the brake is applied standing still, the arms are stressed only in the plane of the cable pull. Of course, the half-round section is stiffest in this direction, though, in fact, not really very stiff. However, when the bicycle is moving and the brake is applied, the rim of the wheel, of course, tends to drag the caliper arms forward very hard. In this direction the cross-section is very weak and inefficient.

This cross-section is also very weak in torsional resistance, so that during hard braking the arms twist enough to change the contact between brake pad and rim so that the rearward end of the brake pad contacts the rim far harder than the rest of the brake pad, thus causing grabbing and jamming.

Furthermore, the standard way of adjusting center-pivoted brakes for "reach", which is the distance from the mounting bolt hole to the side of the wheel rim, is with flattened lower ends of the caliper arms having vertical slots therethrough so that the brake shoes can be shifted vertically within the range of said slots. The pre-flattened and slotted area is still weaker torsionally, which limits its length and therefore the "reach range" of the brake, so that two sizes of brake are needed to cover the different bicycle configurations in general use.

Furthermore, providing a long, flattened, slotted end on the caliper arms means that the extra unneeded length will project below the brake shoe and be unsightly.

Furthermore, in order to clear an occasional fender, or an extremely fat tire, the arms sweep far outward and then back in toward the rims. In addition, the brake pads generally are far thicker than necessary and normally are discarded after less than 50% have been used. Such thick pads also increase the very strong twisting force on the caliper arms because they are so far from a line drawn from arm pivot to rim side. Furthermore, this multi-directional flexing is even worse on center-pull assemblies. The mounting bolt still flexes where it exits the bicycle frame and the arm bridge or U-bracket flexes in the same direction. When the brake shoes touch the rim of the bicycle wheel, the bracket flexes in the same direction, and when the shoes touch the rim, the two caliper arm pivot studs flex outward and upward, and while the lower portion of the arms is short, it is also usually slender so that it flexes and twists.

Another problem with known type brake assemblies is that the brake pads as mounted on the ends of the caliper arms tend to engage the bicycle wheel rim in an unbalanced manner, and the forward motion of the wheel rim pulls the brake pads and shoes forward causing the caliper arms to twist and, therefore, the brake pads are tilted so that only their rearward ends touch the rim. To compensate (at least partially) for such twisting, knowledgeable brake mechanics oftentimes twist the caliper arms with a wrench so that the forward ends of the brake pads contact the rim first. Then when the arms are twisted by wheel motion, the pads rotate and contact the rim flatly. However, most brake manufacturers have totally ignored this need for a "toe-in" adjustment.

Another problem with conventional type caliper arms is that the bearing bore length is so short at the pivot area that the hole actually stretches during braking, allowing further arm movement, and the primary arms, which are not stressed any way except in line with cable pull, are about twice as heavy as intelligent design would have made them. Furthermore, the half-round shape of the caliper arms is about as inefficient as could have been devised for the upper arm.

Another problem is in the cable attaching hardware. Generally, in order to manufacture the arms as cheaply and easily as possible, the upper arms are more or less flat and the cable hardware projects sideways out of the arm ends. Thus, the cable pull (and push) tilts and jams the hardware pieces. Oftentimes the hardware pieces have an incredible number of subcomponents, as many as nine pieces being used in some equipment.

Because in the past conventional type bicycle brakes worked so poorly and had such weak, flexible parts, it was necessary to generally ride with the pads quite close to the wheel rims so that there would be plenty of lever travel available, no matter how hard one squeezed and how much the entire system flexed, stretched, "sponged", etc., and the lever hopefully would not bottom out on the handlebar. Logically, there should be as little lost motion or "sponge" in the system as possible, and once the pads contact the rim firmly, the braking effect should be controlled by how hard the brake handle is squeezed, and not by how far a spongy lever is moved.

SUMMARY OF THE INVENTION

An object of the present invention is to provide an improved bicycle brake operable by hand having complementary, similar, preferably identical, caliper arms, improved structure for mounting a brake shoe at one end of each of the caliper arms, structure at the opposite end of each caliper arm for attaching cable structure for actuating the arms, and bearing pivot structure for supporting the pair of caliper arms from a bicycle frame.

Another object of the present invention is to provide an easily installed bicycle brake assembly which will have improved operating characteristics and increased braking effectiveness.

A further object of this invention is to provide a brake assembly for use on bicycles and the like which is hand-operated and offers an improved cable actuating clamping structure for complementary caliper arms of similar, preferably identical, configuration having improved center bearing pivot structure for mounting the brake assembly on a bicycle frame.

Another further object of the present invention is to provide a bearing support structure for mounting on a bicycle frame which will offer improved and increased bearing support for a pair of complementary caliper arms. Brake pads are mounted on one end of each caliper arm by improved adjustable and pivotable structure, while a cable clamp assembly is used at the other end of the caliper arms for connecting to the brake cable actuating structure.

The present invention has a number of new and novel features. Among them are a greatly enlarged pivot post structure which is far stiffer than conventional for resisting upward or downward flexing of the brake assembly during hard braking, and offers much greater pivot bearing area, which in turn greatly reduces wear thereof. The pivot bearing structure is also substantially lengthened which increases fore and aft stability of the caliper arms when braking hard, and in turn further reduces wear.

Another very important feature of the present invention is the complementary, similar, preferably identical, design and construction of the caliper arms, together with interlocking design of the pivot bore area by means of interdigitated flanges with concentric apertures therethrough, which allows straight instead of offset or bent arm structure, so that cable pull, transverse forces on the arms, and the longitudinal centers of the brake shoes are all in the same plane. It also allows maximum bearing length for each caliper arm without excessive overall width of the two arms when assembled.

Another important feature is the forked ends on the upper portion of each caliper arm, which support the cable attaching hardware on both sides so that this hardware swivels more freely for better alignment. Generally, conventional type center-pivoting designs have cable attaching hardware supported only at one end and cantilevered therefrom, which, of course, tends to load these parts, oftentimes creating a jam or bind thereof rather than having the desired swiveling into perfect centering position. The present invention provides cable-clamping structure via a slotted bolt, a clamping block, and a closed-end nut. This structure permits a much stronger grip on the cable core without severely deforming the cable, and in turn permits the use of cables with badly frayed ends that are difficult to thread through the holes in most cable clamps. In the subject device the cable core can be slid sideways into the slot in the bolt, regardless of whether the cable core end is frayed or capped. In the preferred embodiment, angled sides at the bottom portion of the slot in the cable-clamping bolt create a wedging action that grips the cable more tightly for a given wrenching torque on the nut. Alternate embodiments provide for a square shaped bottom portion of the slot and/or a semi-circular shaped bottom portion.

Another feature incorporates brake shoe adjusting structure comprising concentric convex spherical surfaces on each end of the brake shoe mount, a hole entirely through the brake shoe mount passing through the axial center thereof and substantially larger than the attaching bolt which passes through it, so that the brake shoe can be tilted in any direction for an ideal fit thereof with the wheel rim of the bicycle. A matching convex spherical surface on the lower end of each of the caliper arms and on a separate washer under the attaching bolt head complete the structure. This arrangement is a significant improvement over known previous type structure.

Another important feature of the present invention is that with the brake assembly hereof, whether the assembly is used with wide or narrow bicycle rims, with new or worn brake pads, the cable core and casing will always be nicely and properly aligned.

A further important feature of the present invention is the offsettable mounting post. This offsettable mounting post has an enlarged rear face or head section which is offset from the post main axis. The head section is slotted to receive the head of the mounting bolt, and the mounting bolt is tightened by a nut on the other side of the bicycle frame from the brake assembly. Thus, simply by loosening the nut you can slide the entire brake assembly up or down until the brake shoes are properly in line with the desired portion of the bicycle wheel rim. This greatly improves the flexibility and efficiency of the entire brake assembly during actual installation and use thereof.

The interlocking design of the hub or pivot bearing portions of the complementary, similar, preferably identical, caliper arms function and operate in a greatly improved manner with the offsettable mounting post structure. The interlocking complementary design of the caliper arms also is quite important because it allows for the same element to be used for either the left or right caliper arms, thus greatly reducing tooling costs and inventory problems by the use of two non-similar arms as in generally known center pivot bicycle brake assemblies.

The cable actuating clamping bolt structure is also an important feature. A preferred embodiment utilizes a slot having a wedge-shaped bottom for clamping the cable end. The taper is preferred because tightening of the clamp nut creates an increased wedging action whereby a tighter grip on the cable is achieved with less wrench torque on the nut and bolt. However, alternatives of half-round and square bottom slots are also disclosed. This improved cable clamping nut structure, together with the forked ends of the caliper arms of complementary design, function with improved self-centering and more efficient brake operation.

Therefore, in summary, the problems and defects of prior art bicycle brake assemblies have been considered and solved by the present invention. Existing side-pull, center-pivoting bicycle brakes, the type preferred and used by most bicycle racers and serious cyclists, all suffer from a lack of rigidity, which allows them to flex, chatter, squeal and grab, all of which are undesirable. The problem starts with the small mounting bolt holes that are drilled in the frame members (fork crown in the front, brake bridge in the rear). Larger holes could weaken these members, so brake manufacturers use thin, flexible 6 mm (0.236") diameter bolts that flex upward (on the front brake) or downward (on the rear) under hard braking. Attempts to minimize this flexing have been relatively ineffective, consisting chiefly of slightly enlarging the front portion of the mounting bolt after it leaves the bicycle frame (speaking of the front brake). Furthermore, in trying to keep the caliper arms close to the frame and thus reduce flexing, manufacturers have kept the hub or pivot bearing portion of the caliper arms as short (in a fore and aft direction) as practical. This greatly reduces available pivot bearing area and allows stretching of the material surrounding the pivot bolt, thus allowing more flexing of the caliper arms. Generally, the arms themselves are too thin and of a very inferior cross-sectional shape that allows further flexing and twisting of the arms when braking hard. Also, in order for the brake shoes to be positioned exactly opposite each other on the wheel rim (a necessity), the caliper arms have to be made in lefts and rights which approximately doubles tooling costs and inventory requirements. Furthermore, the arms must have jogs or offsets in order to compensate for the misalignment of brake shoe and hub or pivot bearing. This causes uneven stresses and bending on each arm. Still further, in order to avoid extreme weakening of the lower, flattened, slotted lower ends of the caliper arm ends, the length of this flattened, slotted area is usually limited so that no more than about 10 millimeters of reach range adjustment is available, thus requiring the manufacture and stocking of two sizes of brakes, to fit most bicycles.

Because of the excessive bending and twisting, bicycle shop mechanics have discovered that the lower ends of the caliper arms should be twisted with a wrench, so that the forward ends of the brake shoes will contact the rim first and then when the arms twist from the forward pull of the brake shoes, the rubber pads will meet the rim properly along all or most of their length. This is a very inexact process, often involving over-bending, then over-straightening, then re-bending, etc.

The actuating cables are customarily anchored by hardware that requires poking a wire (often with frayed ends) through a tiny hole and pinching it by tightening a nut, which often deforms the cable. The hardware that grips the cable core or holds its outer casing usually does not swivel freely, so that as the caliper arms change their angle relative to one another, the cable core and its outer casing do not always line up perfectly, which causes unwanted friction and wear. Furthermore, on conventional center-pivoted brakes, these hardware pieces are mounted by one end only, leaving them cantilevered from the caliper arm ends which means that under load they do not swivel freely, and, therefore, the cable core and casing do not align properly.

However, most of the above-described defects and problems are overcome and solved by the present invention(s).

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a cross-sectional view of the lower end of one caliper arm with brake shoe attachment structure.

FIG. 5 is a side view, partly in cross-section, of the cable end clamping nut structure per se.

FIG. 6 is an exploded view of the component elements of the brake assembly of the present invention.

FIG. 7 is a side elevation, partly in cross-section, of the support head with integral support bearing projection taken along lines 7—7 of FIG. 6.

FIG. 8 is an end view taken along lines 8—8 of FIG. 7.

FIG. 9 is an exploded perspective of the support head, support bearing projection, adaptor bushings, and mounting bolt.

FIG. 10 is a perspective of a pair of interlocked and interengaged similar caliper arms of the present invention.

FIG. 11 is an elevation showing both the front and back of the caliper arm construction per se.

FIG. 12 is a view taken along lines 12—12 of FIG. 11.

FIG. 13 is a modified embodiment of the clamping block and slot of the FIG. 5 structure.

FIG. 14 is a further embodiment of the clamping block and slot of the FIG. 5 structure.

FIG. 15 is another modification of the clamping block pivotal support of the FIG. 6 structure.

FIG. 16 is still another modification of the clamping block pivotal support of the FIG. 6 structure.

DESCRIPTION OF THE PREFERRED EMBODIMENT(S)

Figure 1:
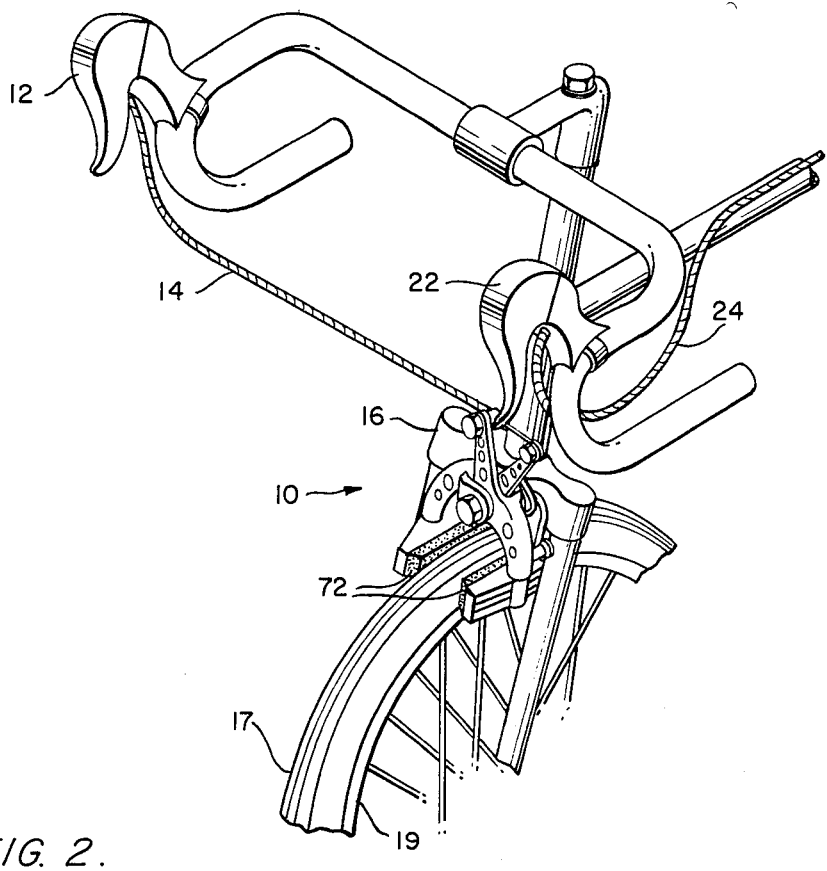
FIG. 1 is a perspective view of a front wheel fork and handlebar of a bicycle with the present invention mounted thereon.

Referring to FIG. 1 of the drawings, reference numeral 10 indicates in general the bicycle brake assembly of the present invention. The brake assembly is shown as mounted on the front fork of a conventional type bicycle having a frame, a pair of handlebars and a front brake actuator 12 with connecting cable assembly 14 to the brake assembly 10 mounted on the front fork 16. A rear brake actuator 22 is connected by a similar brake cable 24 to the rear brake assembly, not shown.

Figure 2:
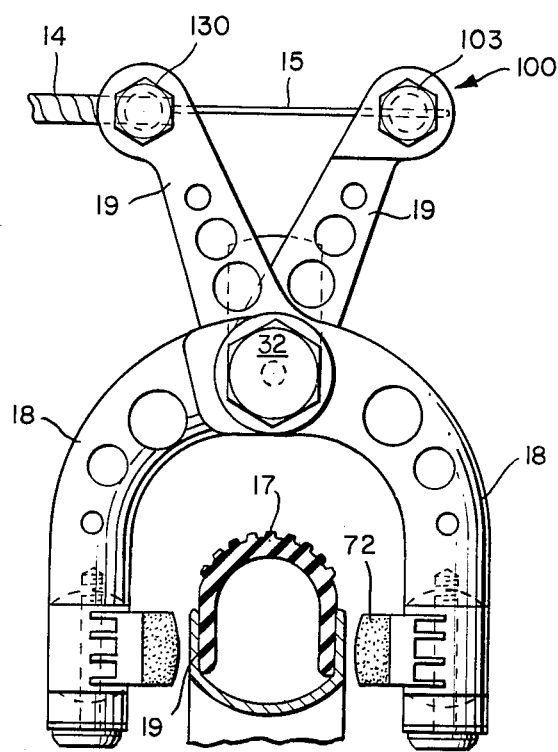
FIG. 2 is a front elevational view of the brake assembly of the present invention.
Figure 3:
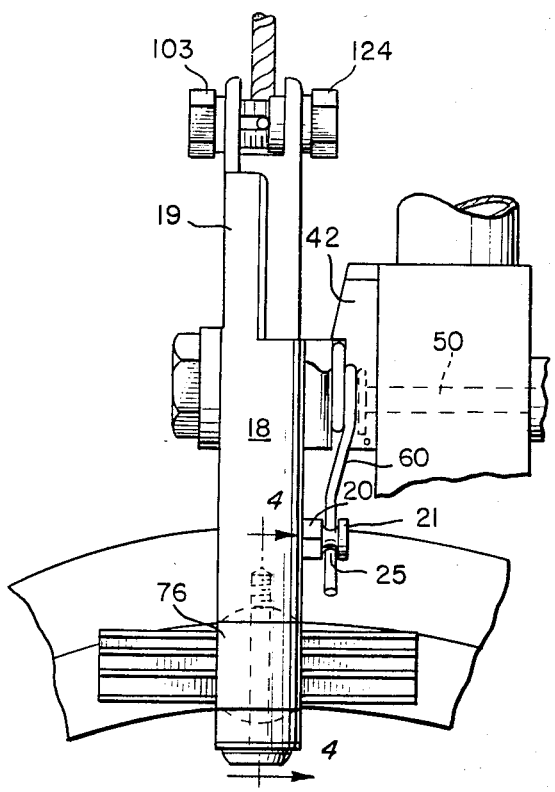
FIG. 3 is a side elevational view of the brake assembly of the present invention.

FIGS. 2, 3 and 6 show the overall brake assembly with the complementary, similar, preferably identical, pre-formed caliper arms 18. As best seen in FIG. 6, each caliper arm 18 has a center portion provided with an offset 26 having a complementary bearing support 28 thereon. Apertures 218 and 228 through these portions receive the offset mounting support bearing structure. This structure, shown in FIG. 6, preferably includes a sleeve 30 of flexible, slippery, low friction material such as Teflon or the like which closely fits inside the apertures 218 and 228 of the pair of caliper arms which are interlocked together as indicated by the dot-dashed lines in FIG. 6 and in cross-section in FIG. 7. Washers 36 of similar material, i.e., Teflon or the like, are preferably provided at either end of the sleeve 30 and a further metal washer 38 separates the closest caliper arm portion 28 from the support head 42. A slot 43 in the support head receives the center portion of actuating spring 60 therein. The washer 38 prevents the caliper arm from contact with either the support head 42 or the spring portion 60. Other low friction washers may be used between the interlocked caliper arms as shown in FIG. 7. This sliding action permits the so-called "reach" of the brake to be incrementally adjusted as desired, over a large range, and it can be further extended by interposing spherical-ended spacer bushings between the brake shoes and the caliper arm ends. The support head 42 has a slot 142 therein, the inner area of this slot being larger than the outside face 242. The enlarged head 52 of the attaching bolt 50 slides within slot 142 and is retained therein by flanges 342 on the face 242. A cross-pin 44 inserted into apertures 45 of the head 42 retains the support bolt 50 within the slot. Threads 54 on the end of bolt 50 receive a locking nut 56 thereon. A flat or curved washer bushing 58 (or 158) which will mate with the flat or curved portion respectively of the fork or other part of the bicycle frame, as required, is also shown. Extending from support head 42 and integral therewith is a support bearing post 130. This post 130 fits within bearing sleeve 30 and extends to slightly past the furthermost portion 28 of the second caliper arm after assembly. A locking bolt 32 having threads 34 thereon screws into the internal threads 230 of the bearing post to securely hold the assembly together. A metal washer 38 and a low friction washer 36 may also be used in this position.

The brake release actuating spring 60 has coiled portions 62 thereon and tip ends 160. The tip ends 160 engage with the groove 25 provided in studs 20 as formed by the flanges 21. The apertures 225 through the lower ends of caliper arms 18 extend from one side to the other and can be threaded 125 along the entirety thereof so that the screw portions 23 of the studs 20 can be inserted and screwed into either side of the caliper end. This is in keeping with the symmetrical, complementary, similar, preferably identical, configuration of the caliper arms 18. However, in some models, the studs 20 can be fitted into the apertures 225 by a press fit.

Also, the lower end of the caliper arm 18 is provided with a concave recess 88 for receiving and supporting brake shoe structure therefrom. This brake shoe structure provides smooth, non-ridged, non-corrugated shoes for greater braking efficiency. The pads 72 are mounted upon brake shoes 70 of aluminum or other lightweight metal by the use of longitudinal grooves 172 in the pads and longitudinal L-shaped flanges 170 extending from the shoe 70. Fins 74 on the backside of each brake shoe provide for better heat dissipation during hard braking and provide a light but rigid structure. A mounting and support cylinder 76 is integral with the brake shoes 70. Each end of brake support 76 has a spherical convex projection 78 thereon. One spherical end mates with and complements the spherical concave recess 88 of the lower caliper arm, while the other end complements and mates with the spherical concave recess 84 of a support bushing 82. The convex projections must be concentrically in line with each other about a central axis through the center of the support cylinder 76. Support bushing 82 has its other end 85 flat for mating with a flat washer 87. The head 92 of an attachment bolt 90, i.e., the inner side thereof, engages with washer 87 and the bolt threads 91 are screwed into the aperture 92 of the caliper arm having complementary threads 192. A hex-shaped recess 93 is preferably provided in head 92 for maximum securement of the bolt 90. FIG. 4 shows in cross-section this arrangement, and also clearly depicts the enlarged passageway 176 of the support cylinder. The dot-dash lines in FIG. 4 show the degree of brake adjustment which is permitted by this mounting construction, a maximum tilt angle of 5° in either direction vertically, or 10° overall vertically. It is quite sufficient, and in actual practice permits the brake pad 72 to properly engage the bicycle wheel rim 19. Of course, the bicycle tire 17 mounted on rim 19 is in turn effectively braked.

Looking at FIGS. 5 and 6 of the drawings, the cable clamping nut structure will now be described. The clamping nut has two main portions, a nut structure 103 having a cylindrical shank portion 102 with internal threads 104 therein, and a bolt 124 having a rather large projecting cylindrical shank 224 with external threads 114 thereon. Cylindrical shank portions 102 and 224 fit closely but rotatably in the apertures 148 and 248. A slot 120 is provided entirely across the projection 224 and to approximately mid-way thereof. The inner end of this slot is preferably formed with a wedge shaped bottom 222. However, a square shaped bottom 222' or a semi-circular shaped bottom 222" may be used as alternates (see FIGS. 13 and 14). Complementary to the slot 120 and bottom as discussed is a clamping block 110 which is arranged to slide within the slot 120. A pin 108 can extend from the clamping block 110 for engagement within hole 105 in the nut 103, the end being suitably swaged or deformed 112 after mounting within nut 103 to retain the pin 108 and clamping block 110 attached thereto swivelably from the nut 103. During use, the cable 15 is inserted into slot 120 and placed approximately near the bottom of the slot in the shaped portion thereof. Then clamping block 110 is inserted into the slot and the nut threads 104 screwed onto threads 114 of the bolt 124. The nut is adjusted finger tight and then by suitable application of wrenches or similar tools, the desired degree of securement of the cable can be effected. Of course, with the wedge construction 222 shown, a slight amount of tightening of nut 103 will effect a substantial increase in clamping of the cable end. Similar cable clamping will be effected by either the semi-circular 222" or square bottom 222' configurations; however, of course, less wedging action as such will be effected.

FIGS. 15 and 16 show other embodiments of the clamping block 110 and pivot structure therefor. FIG. 15 has a clamping block 110' with a central aperture 112 therein for receiving a pin 208 with round circular head 308. Raised ribs or knurling 219 frictionally retain the pin 208 within aperture 112 of the clamping block once assembled. FIG. 16 shows an enlarged flat projection 408 which is integral with clamping block 110" but of less width so that it can fit inside of nut 103 (see FIG. 5). A pin 508 similar to pin 108 extends from projection 408, and the end thereof can be swaged like 112 after mounting in nut 103.

In the front elevation of FIG. 2, the preferred arrangement of the brake shoe 72 relative to the wheel rim 19 as mounted on the lower ends of caliper arms 18 is shown. Also, the brake actuating cable 14 with the actual center core 15 thereof is shown as attached and mounted by the upper caliper arm clamp structures 130, 230 and 100, as already described. The cable casing adjuster structure 130, 230 is of known conventional design and will not be described in greater detail. The structure 100 is the new and improved cable clamping lock nut structure described above.

Looking at FIGS. 7, 8 and 9, the center support bearing structure 100 with locking bolt 32 and offset support head 42 can be seen. It can be easily visualized how the support head mounted on support bolt 50 can be adjusted up and down relative to the bicycle frame. This together with the adjustable convex/concave brake pad attachment structure permits maximum flexibility and ease of overall assembly, mounting and adjustment. The bushings 158 with concave surfaces 258 (FIG. 9) permit the brake assembly to be mounted on a curved portion of a bicycle.

FIGS. 10-12 show, per se, the new and novel caliper arms of the present invention. The similar configuration of each arm as it relates to a second similar arm is quite clearly shown. The forked caliper arm ends with the pair of projections 119, 219 can be clearly seen. The projection 219 is supported by offset flange 319 so that the apertures 148, 248 are spaced apart so that the brake actuating cable passes between them. Thus, the cable clamp is supported on each side of the cable, so a balanced pull (force) is exerted on the mechanism. The present invention provides for center pivoting of the pair of caliper arms with the upper arms forked and offset so that when said pair of arms are assembled, the forked ends are opposite each other and in the same plane as the mounting axis of the brake shoes, while the upper arms' main sections are free to move past each other (see FIGS. 2, 3 and 10). This is a very important aspect of this invention, and is new and unique in the industry.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. A hand-operated bicycle brake comprising:
a pair of caliper arm means of complementary, similar construction for effecting a braking action;
means for mounting a brake shoe at one end of each of said pair of caliper arm means;
means at the opposite end of each pair of caliper arm means for attaching actuating cable structure thereto;
bearing means for pivotably supporting said pair of caliper arm means in an interengaged manner from a bicycle frame;
said means for attaching actuating cable structure to said caliper arm means including cable clamp structure comprising a complementary nut and bolt, and cable clamping means therebetween;
said cable clamping means comprising said bolt having a threaded projection extending therefrom with a slot extending from the outer end of said projection toward the bolt head, and said nut having an internally threaded portion for complementary threaded engagement with the threaded projection of said bolt, and means on said nut for squeezing the cable and locking it in position as the nut and bolt are screwed together; and
said means for squeezing and locking the cable including a clamping block attached to the nut, said clamping block being rotatably mounted on the nut.

2. The hand-operated bicycle brake as defined in claim 1, wherein the bottom of said slot in the bolt is provided with a wedge-shaped tapered end and the clamping block of the nut has a complementary wedge-shaped tip thereto, for clearance purposes.

3. The hand-operated bicycle brake as defined in claim 1, wherein the bottom of said slot in the bolt is provided with a semi-circular shaped end.

4. The hand-operated bicycle brake as defined in claim 1, wherein the bottom of said slot in the bolt is provided with a square bottom shaped end.

5. A hand-operated bicycle brake comprising:
a pair of caliper arm means of complementary, similar construction for effecting a braking action;
means for mounting a brake shoe at one end of each of said pair of caliper arm means;
means at the opposite end of each pair of caliper arm means for attaching actuating cable structure thereto;
bearing means for pivotably supporting said pair of caliper arm means in an interengaged manner from a bicycle frame;
said bearing means for pivotably supporting said pair of complementary caliper arm means from a bicycle frame comprising a support head;
a support bearing stud with a cantilever end extending from said support head for reception within the interlocked and interengaged pair of complementary caliper arm means for supporting same from a bicycle frame; and
said support head having a longitudinal recess therein for reception of a large head support bolt therealong, said support bolt being retained within said recess by retention means.

6. The hand-operated bicycle brake as defined in claim 5, wherein said support head supports a brake release spring therefrom, said spring having ends which abut replaceable studs mounted on the lower ends of said pair of complementary caliper arm means.

7. A hand-operated bicycle brake comprising:
a pair of caliper arm means of complementary, similar construction for effecting a braking action;
means for mounting a brake shoe at one end of each of said pair of caliper arm means;
means at the opposite end of each pair of caliper arm means for attaching actuating cable structure thereto;
bearing means for pivotably supporting said pair of caliper arm means in an interengaged manner from a bicycle frame;
said bearing means for pivotably supporting said pair of complementary caliper arm means from a bicycle frame comprising a support head;
a support bearing stud with a cantilever end extending from said support head for reception within the interlocked and interengaged pair of complementary caliper arm means for supporting same from a bicycle frame; and
a flexible low friction bearing sleeve being provided between the support bearing stud and apertures provided in the pair of caliper arm means for maximum ease of pivotable movement of said caliper arm means thereabout.

8. The hand-operated bicycle brake as defined in claim 7, wherein the cantilever end of said support bearing stud is provided with a threaded aperture, and a headed locking bolt is threadably mounted in said threaded aperture for retaining the interlocked caliper arm means as mounted upon the support bearing stud.

9. The hand-operated bicycle brake as defined in claim 8, together with flat washers of slippery, flexible, low friction material on either end of said flexible low friction support bearing sleeve and at the intermediate arm-to-arm interfaces to assure that the sides of the interlocked caliper arm means will pivot freely relative to the locking bolt head and the support head and to each other.

10. Structure for use with a bicycle brake assembly comprising: a brake caliper arm of predetermined configuration having an elongated body structure, a center portion for supporting said caliper arm in a pivotable manner from bearing support structure as mounted on a bicycle frame, said center portion including at least one central aperture therethrough, means provided at one end of said caliper arm for affixing brake pad/shoe structure thereto so that said pad/shoe structure is adjustable in all planes, means provided at the other end thereof for receiving a cable clamp structure therewith for effecting application of brake force along the central axis of said caliper arm; and said central mounting bearing structure including in addition to the aforesaid central aperture an offset portion having a complementary aperture therethrough so that said overall arm can be interlocked with another similar arm and the entire structure comprising a pair of complementary similar caliper arms mounted upon a single bearing support.

11. The structure as defined in claim 10, wherein said brake pad/shoe structure support means includes a concave spherical recess at one end of said caliper arm together with a threaded aperture in alignment therewith for receiving a brake pad/shoe structure mounting bolt.

12. The structure as defined in claim 10, wherein said cable clamp mounting means at the other end of said caliper arm includes a forked projection, each tine or leg having a central aperture therethrough for receiving cable clamp structure in a balanced manner therewith.

13. A brake shoe structure for use with a bicycle brake assembly comprising: a substantially flat brake pad, a brake shoe for integrally supporting said brake pad therefrom, a support member integral with said brake shoe, and means provided with said support member for permitting flexible, easy adjustment, in all directions, of the brake shoe at one end of a brake assembly caliper arm; said means with said support member comprising a support cylinder having spherical projections at each end thereof, one end engageable with a similar spherical recess in the end of a caliper arm and the other spherical projection for complementary mating with a bushing having a similar spherical recess therein; a mounting bolt and a flat washer mating with a flat surface of said mounting bushing; and a central hole of said mounting support cylinder being substantially larger than the outside diameter of the mounting bolt so that the brake shoe can be pivoted at least 5° either way, from the vertical, or 10° overall, or at any desired angle therebetween.

14. The brake shoe structure as defined in claim 13, together with said mounting bolt having a hex-shaped recess provided therein, and a threaded portion for screwing into an aperture in a complementary caliper arm recess for maximum securement of said brake shoe structure in easily pivotable fashion.

15. A brake actuating cable clamping structure comprising: a nut and bolt having two separable parts; complementary means therewith for clamping the end of a cable therebetween in a manner for effectively increasing the action of clamping with the minimum amount of force required for tightening the parts thereof for reducing the chances of cable slippage; said nut/bolt combination including a bolt part having a tool engaging portion, a threaded portion, and a recess slot extending therein from one end to approximately midway thereof, a complementary nut part having internal threads mountable upon said threaded portion of said bolt part and provided with a further tool engaging portion therewith; and said nut part being provided with a clamping means which slides in the slot of the bolt for effectively squeezing and locking the cable core.

16. The brake actuating cable clamping structure as defined in claim 15, wherein the end of the slot is wedge shaped, and said clamping means includes a clamping block rotatably mounted on said complementary nut part, said clamping block having a wedge-shaped edge.

17. The brake actuating cable clamping structure as defined in claim 15, wherein the end of the slot is square shaped, and said clamping means includes a clamping block rotatably mounted on said complementary nut part.

18. The brake actuating cable clamping structure as defined in claim 15, wherein the end of the slot is semicircular shaped, and said clamping means includes a clamping block rotatably mounted on said complementary nut part.

19. A pivot support structure for bicycle brake apparatus comprising: a support head, mounting means slidably mounted on said support head, an integral projection with said support head, said integral projection being cylindrical and of elongated configuration, and provided with means at the end thereof for reception of locking structure therewith for holding brake caliper arms pivotably mounted upon said projection; said support head mounting means comprising a recess having an overlapped slot therewith, a large headed bolt slidable within said recess for mounting said support head from a bicycle frame, and retaining means for preventing said large headed bolt from egress from said slot after assembly thereof with said support head.

20. The pivot support structure as defined in claim 19, wherein said large headed bolt is provided with a locking nut on the other end thereof, and a mounting bushing also mountable upon said bolt and engageable by said locking nut, said mounting bushing having at least one surface of complementary configuration to a portion of a bicycle frame.

21. The pivot support structure as defined in claim 19, wherein said support head is provided with a transverse slot therethrough for receiving and supporting a brake release spring therefrom.

22. The pivot support structure as defined in claim 21, wherein said projection is provided with a flat metal washer for covering the spring slot, a low friction material washer over said metal washer, a low friction bearing sleeve over the main support area portion of said projection, low friction flat washers at the other arm-to-arm interfaces, a further low friction washer, and a locking bolt threadably mounted within a recessed aperture at the end of said projection for maximum securement therewith after suitable brake actuating caliper arms are mounted thereupon.

* * * * *